United States Patent
Siwersson et al.

[15] 3,685,638
[45] Aug. 22, 1972

[54] DEVICES FOR GUIDING MATERIAL TO THE ENTRANCE END OF A SCREW CONVEYOR HAVING A ROTATABLE SCREW AND A CONDUIT THEREFOR

[72] Inventors: Olle Lennart Siwersson, Gartnergatan 4,, 252 51 Helsinborg; Karl Gunnar Tell, Malmogatan 3a, 252 49 Helsingborg, both of Sweden

[22] Filed: Jan. 29, 1971

[21] Appl. No.: 110,997

[30] Foreign Application Priority Data

Jan. 29, 1970 Sweden ..................... 1107/70

[52] U.S. Cl. .................................................. 198/213
[51] Int. Cl. ............................................. B65g 33/00
[58] Field of Search ...................... 198/213; 239/687

[56] References Cited

UNITED STATES PATENTS

2,672,347   3/1954   Rausch ..................... 239/687

FOREIGN PATENTS OR APPLICATIONS

2,000,338   9/1969   France ..................... 198/213

Primary Examiner—Richard E. Aegerter
Attorney—Karl W. Flocks

[57] ABSTRACT

A device for guiding material to the entrance end of a conveyor comprising a screw which is rotatable about its longitudinal axis, and a stationary conduit therefor, consists of guide means rotatable about the longitudinal axis of the conveyor and coupled to the screw to rotate together with it.

4 Claims, 8 Drawing Figures

INVENTORS
OLLE LENNART SIWERSSON
KARL GUNNAR TELL

BY KARL W FLOCKS

ATTORNEY

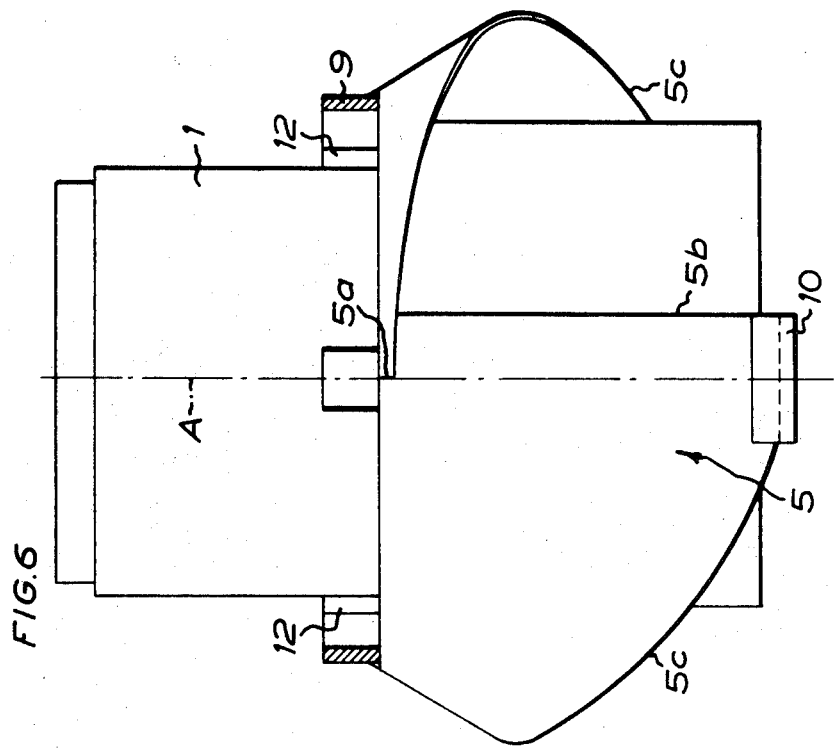
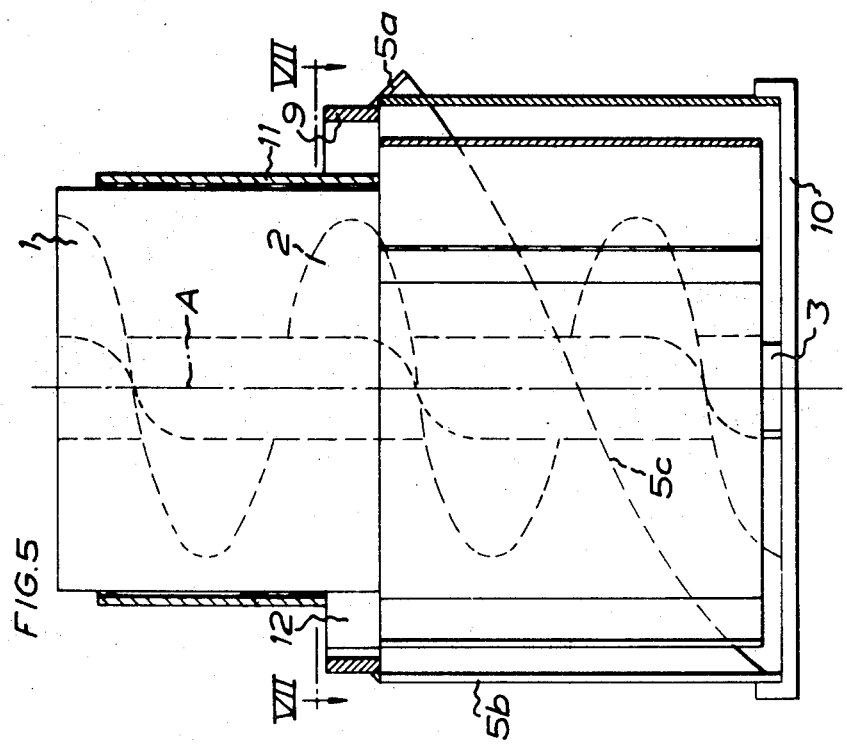

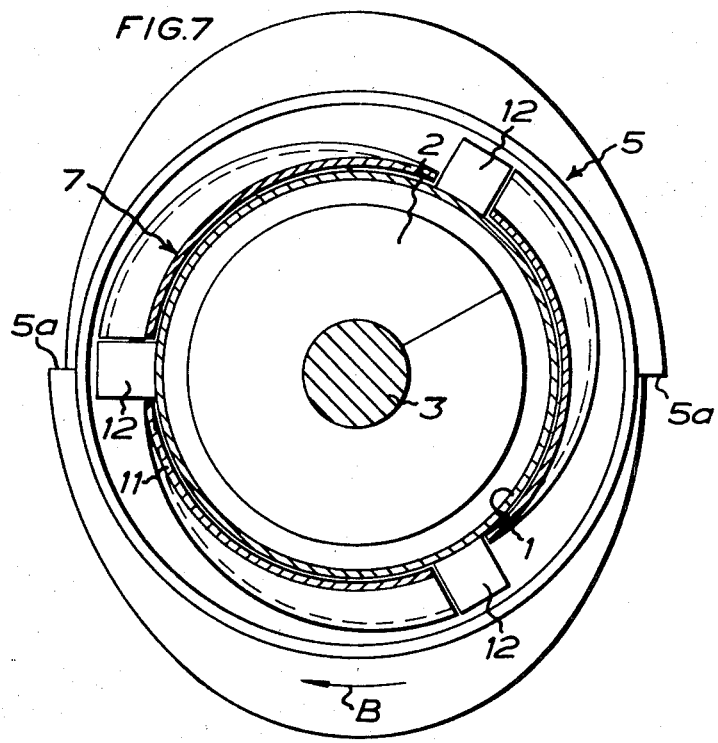
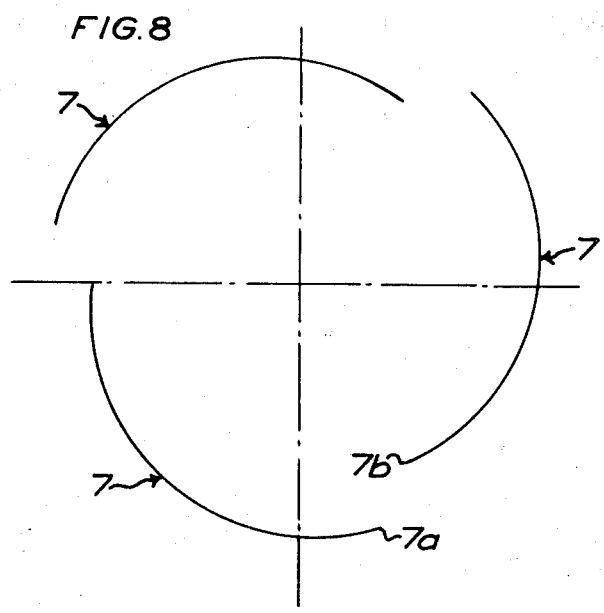

DEVICES FOR GUIDING MATERIAL TO THE ENTRANCE END OF A SCREW CONVEYOR HAVING A ROTATABLE SCREW AND A CONDUIT THEREFOR

This invention relates to a device for guiding material to the entrance end of a screw conveyor having a screw which is rotatably about its longitudinal axis, and a stationary conduit therefor, said device being of the type comprising at least one guide surface which is adapted to be rotated about the longitudinal axis of the screw conveyor.

In the construction of guiding devices of the type referred to in the foregoing it has been considered necessary that the rotatable guide surface of the guiding device rotates independently of the screw. However, surprisingly enough it has been found that this is not absolutely necessary since the guide surface rotatable about the longitudinal axis of the screw conveyor can to advantage be coupled to the rotatable screw to rotate with it. The advantages gained are particularly obvious at certain speeds of the rotatable screw and thus of the guide surface. At other speeds and in cases where the guide surface consists of a stationary portion and a portion which is adapted to be rotated about the longitudinal axis of the screw conveyor still better results have been attained when the stationary guide surface portion is disposed between the rotatable guide surface portion and the screw. In fact, at certain speeds the material tends to remain in the space between the screw and the guide surface portion rotatable together with said screw and to rotate together with these means without being carried forward by the screw and leaving room for further material fed by the guiding device to the rotatable screw. This tendency is eliminated by the stationary guide surface portion which against the action of the centrifugal force generated by the screw and the guide surface portion is able to give this force another direction and to guide the material inwardly to the screw.

The invention shall be described hereinbelow with reference to the accompanying drawings, in which:

FIG. 5 is a partial longitudinal section of said further modification;

FIG. 6 is a side elevation, partly in section, of said further modification;

FIG. 7 is a section on line VII—VII in FIG. 5;

FIG. 8 is a diagrammatic cross section of certain means in the two modifications of the device.

Figure 2:
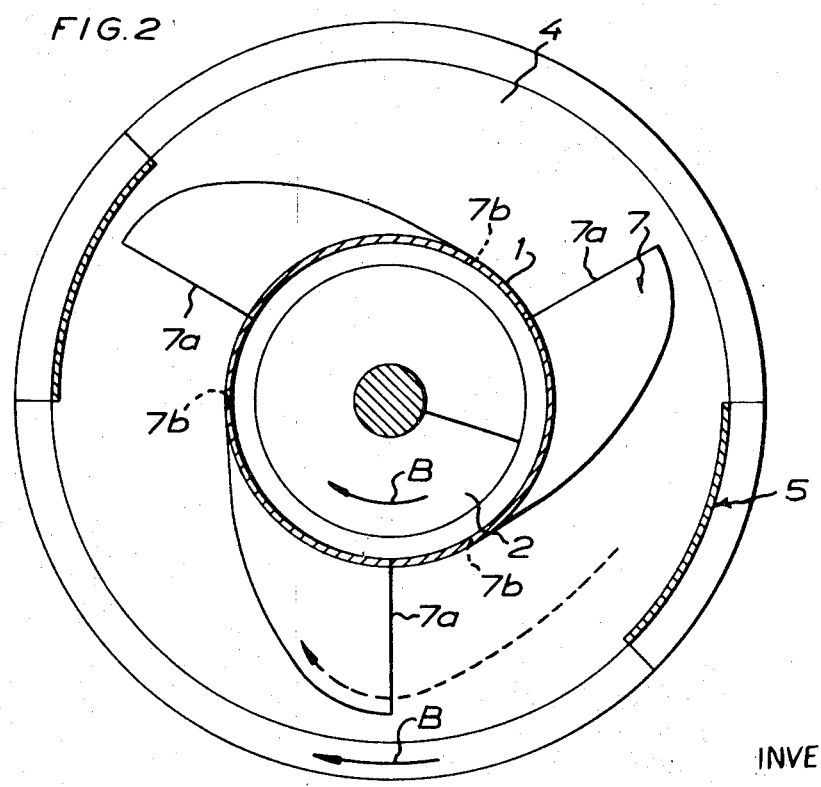
FIG. 2 is a horizontal section on line II—II in FIG. 1.

In the drawings, a stationary conduit is designated 1 and a screw which can be rotated about its axis A (shown by a dash-and-dot line) is designated 2. On the end of the shaft 3 of the screw 2 there is mounted a disk 4 to which a pair of guide vanes generally designated 5 are fixedly connected. The respective guide vane 5 which forms an outer guide means extends obliquely upwardly and inwardly from the disk 4 towards the screw 2 simultaneously as it tapers and changes its angle in relation to the axis A of the screw and thus the screw conveyor. The screw 2 and the guide vanes 5 are arranged to be rotated in the direction indicated by the arrow B in FIG. 2 by means not shown. The leading edge 5a of the vane 5 makes an angle with the axis A of the screw 2 which is considerably more obtuse than the angle made by the trailing edge 5b of the vane with the same axis. Thus the vane 5 at its rotation will successively guide the material caught by the leading edge 5a and a portioning vane 6 radially towards the screw 2 which at last catches the material and conveys it forward in the longitudinal direction of the conveyor.

Mounted between the lower end of the screw 2 and the guide vanes 5 are guide surface portions generally designated 7, which in the embodiment shown are secured to the conduit 1. The guide surface portions 7 forming inner guide means, as will appear from the drawings, substantially are in the from of vanes having a leading edge 7a which largely has the same inclination as the trailing edge 5b of the guide vanes 5. From this leading edge 7a the guide vanes 7 successively change directions and finally merges with their trailing edges 7b in the conduit 1.

Figure 1:
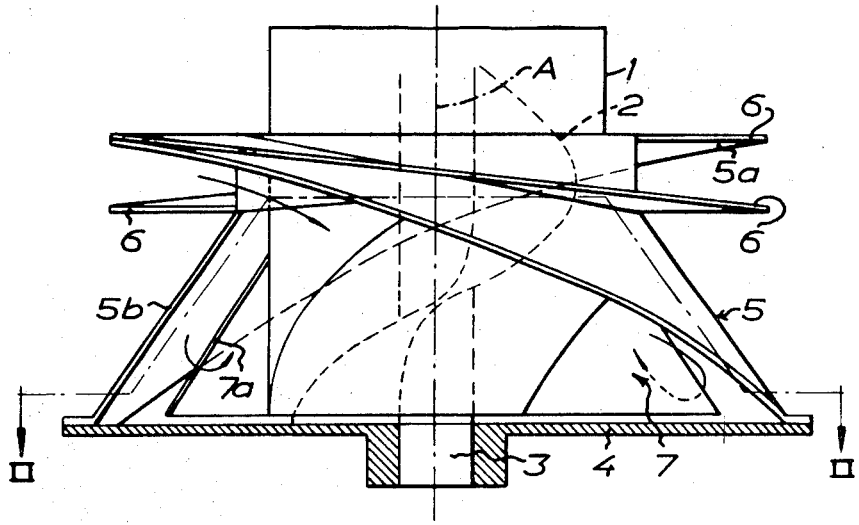
FIG. 1 is a longitudinal section of the device and the end of a screw conveyor.
Figure 3:
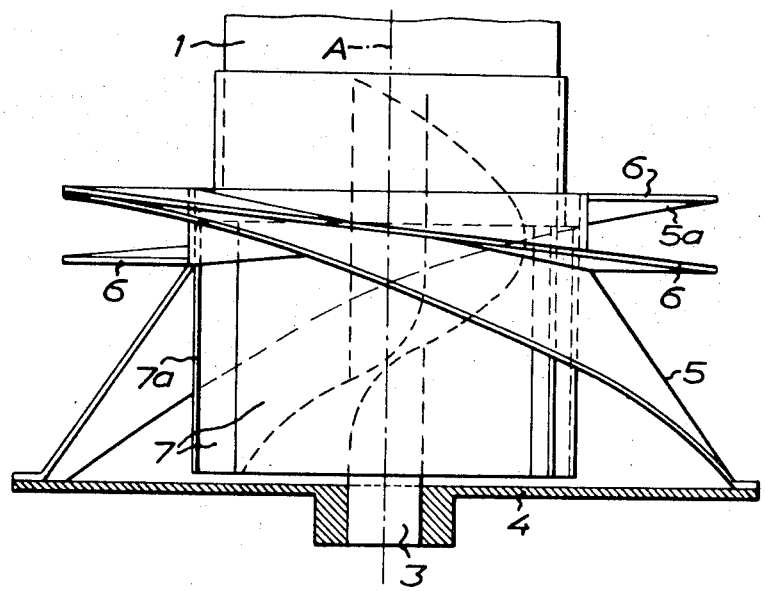
FIG. 3 is a side elevation, partly in section, of a modification of the device according to the invention.
Figure 4:
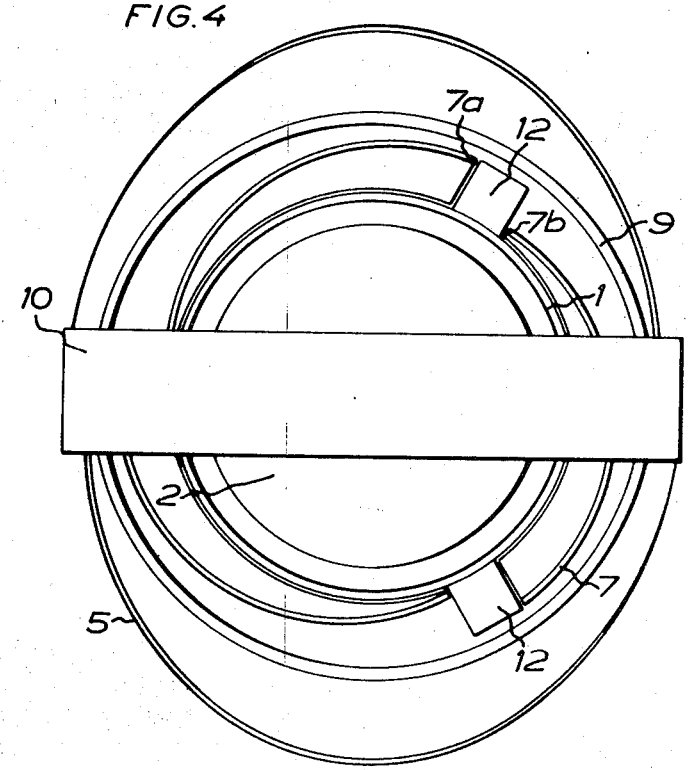
FIG. 4 is an end view of a further modification of the device and a screw conveyor.

In the modification shown in FIG. 3 the guide surface portions 7 as inner guide means extends parallel with the axis A of the conveyor. Also the leading edges 7a of the inner guide means 7 extend parallel with the axis A of the conveyor. Besides, the inner guide means 7 are eccentrically arranged with respect to the axis A. The modification described in FIG. 3 has this arrangement of the guide means 7 in common with the further modification illustrated in FIGS. 4–8. In this further modification the leading edge 5a of the guide vane 5 forming the inner guide means is inclined at an angle of 45° with respect to the axis A while the trailing edge 5b of the guide vane 5 extends parallel with the axis A. The edge 5c of the guide vane extends from a point adjacent a ring 9 at the end of the conduit 1 to a rail-shaped connecting member 10 corresponding to the disk 4 in the embodiment according to FIGS. 1 and 2 and secured to the shaft 3 of the conveyor. The edge 5c extends substantially helically. By this shape of the guide vane 5 the greater part of the edge 5c will act as a portioning edge which portions and feeds material to the guide surface of the guide vane situated inside the edge 5c. The inner guide means 7 have their ends adjoining the conduit 1 attached to a sleeve 11 which is movable in parallel with the axis A and extends upwardly around part of the conduit 1. By movement of the sleeve 11 the inner guide means 7 can be displaced axially and thereby it is possible to control the transmission of material to the inner guide means 7. The conveying capacity of the screw conveyor can thus be controlled, which is of particular importance when the conveyor is started, but also at temporary interruptions of the conveying action of the conveyor, without it being necessary to stop the conveyor. To prevent that the inner guide means 7 are rotated about the axis A, studs 12 are provided on the outer side of the conduit 1. The studs 12 are disposed between adjoining leading and trailing edges 7a, 7b of the inner guide means 7 which are thus in sliding engagement with the studs 12.

The connecting member 10 may be shaped as a propeller in order not to diminish the guiding effect of the device.

What we claim and desire to secure by Letters Patent is:

1. A device for guiding material to the entrance end of a screw conveyor having a screw rotatable abouts it longitudinal axis and a stationary conduit, said device being of the type comprising at least one guide surface which is adapted to be rotated about the longitudinal axis of the screw conveyor, characterized in that the guide surface which is rotatable about the longitudinal axis of the screw conveyor is coupled to the screw to rotate together with it and extends in a direction around said screw.

2. A device as claimed in claim 1, in which the guide surface consists of a stationary portion and a portion which is adapted to be rotated about the longitudinal axis of the screw conveyor, characterized in that inner guide means for the material which form the stationary guide surface are disposed between the plane of rotation of the outer guide surface portion which is rotatable about the longitudinal axis of the conveyor, and the screw.

3. A device as claimed in claim 2, characterized in that the inner guide means is secured in the conduit.

4. A device as claimed in claim 2, characterized in that the inner guide means is axially movably mounted with respect to the conduit.

* * * * *